Aug. 19, 1941.    E. J. KARLBERG    2,253,300
UNIVERSAL JOINT
Filed Aug. 24, 1938

Inventor:
Ernest J. Karlberg.
By: Edward C. Fitzhugh
Atty.

Patented Aug. 19, 1941

2,253,300

UNITED STATES PATENT OFFICE 2,253,300

UNIVERSAL JOINT

Ernest J. Karlberg, Rockford, Ill., assignor to Borg-Warner Corporation, Chicago, Ill., a corporation of Illinois Application August 24, 1938, Serial No. 226,471

5 Claims. (Cl. 64—17)

This invention relates to universal joints, and particularly to the strap type of joint.

It is an object of the present invention to provide an improved universal joint structure having outstanding manufacturing and assembling advantages. More specifically, it is an object to provide a structure that is economical to manufacture, and which is readily accessible to high speed tools for the purpose of assembly and disassembly. It is an object to provide a joint which is readily installed and removed without the necessity of disturbing the line of shafting at any point other than that at which the joint is located.

A further and more specific object of the present invention is to provide in a strap type joint a particular relation between strap, trunnion and yoke whereby the parts are prevented from working loose.

Other objects and advantages of my improved structure will become apparent from a reading of the attached specification in conjunction with the appended drawing, wherein.

Figure 2:
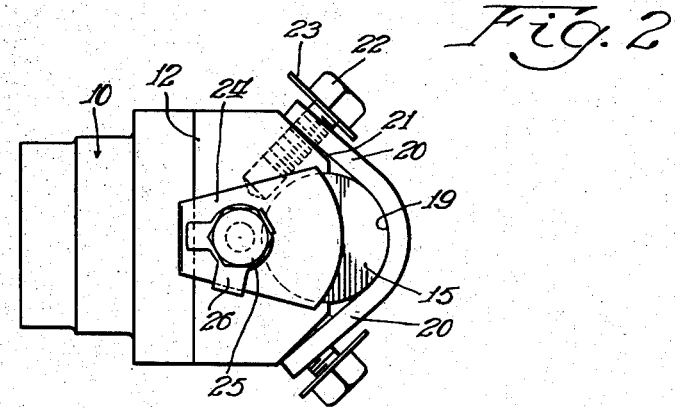
Fig. 2 is an elevation of a portion of the structure shown in Fig. 1, bringing out to advantage the novel relationship between the yoke arm, bearing sleeve and attaching strap.
Figure 1:
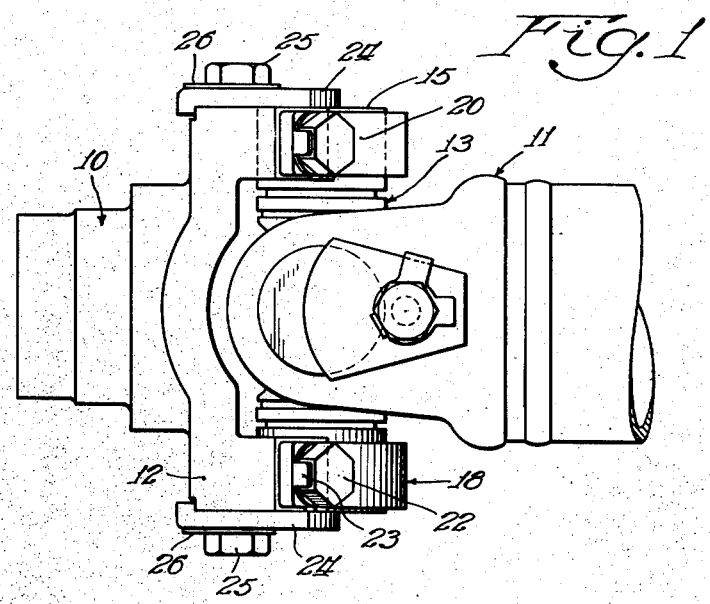
Fig. 1 is an assembly view showing a preferred embodiment of my invention.
Figure 3:
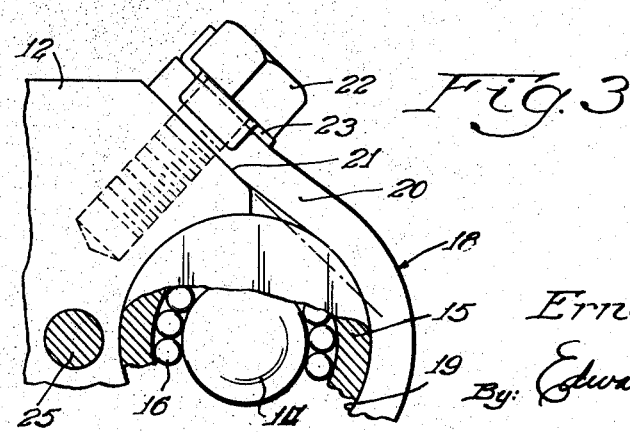
Fig. 3 is an enlarged broken away section view of the structure of Fig. 2, showing to advantage the position taken by the parts when the clamping bolts are turned down tightly against the tangential portion of the strap to tighten the same against the complementary attaching surface on the yoke arm.

A pair of yoke members are indicated generally at 10 and 11, having yoke arms 12 connected together by spider member 13. These yoke members may be arranged for attachment in a line of shafting in the usual manner such as by splined or welded connections. The spider member 13 is formed with radially extending trunnions 14 enclosed in bearing cups 15 in which operate needle bearings 16. The bearing cups 15 are mounted in the yoke arms 12 and clamped thereto by means of a special arrangement of steel straps 18 that will now be described in detail.

Each of the straps 18 are formed with a central arcuate portion 19 terminating in outwardly diverging substantially tangential portions 20 (Fig. 2). Arcuate portion 19 of strap 18 engages the outer periphery of the bearing cup 15 to hold the same against a seat formed therefor in yoke arm 12. The substantially tangential portions 20 of the strap 18 are received on complementarily formed connecting faces 21 on yoke arm 12. These faces 21 define a small angle with the adjacent face of the tangential portions 20 of strap 18. The plane of the face 21 extended intersects the bearing sleeve. The faces 21 converge in the direction of the bearing cup and are each inclined at an acute angle to the axis of rotation of its corresponding yoke member. The tangential portions 20 are clamped to complementary faces 21 by means of bolts 22 inserted in threaded recesses in and at substantial right angles to the faces 21. When the bolts 22 are turned tightly into place, it will be seen that the tangential portions 20 of strap 18 will be slightly distorted into conformity with faces 21 with the result that bearing sleeves 15 are clamped quite securely in position against their seat in yoke arm 12. Lock washers 23 are preferably interposed between the head of nut 22 and the end portion of the strap. Bearing sleeve retainer plates 24 are held in place by bolt 25 prevented from receding by lock washer 26.

This diverging arrangement of the end portions of the strap and their attaching surfaces formed on the yoke arm is of particular advantage in that assembly and disassembly is greatly facilitated. The bolts 22 are thus readily accessible for the use of high speed tools without actually positioning the axis of the bolts 22 in a plane normal to the axis of rotation of the yoke member. By clamping the bearing sleeves to the yoke arm in the above manner, it is thus made possible to readily install and remove the joints from a line of shaft without disturbing the same at any point other than that at which the joint is located.

By inclining the attaching surfaces 21 at an angle to the axis of rotation of the yoke member and also having these faces define a small angle with the adjacent face of the substantially tangential portions 20 of the strap 18, a markedly increased clamping action is thus effected. This results from the fact that the portions 20 of strap 18 which are normally tangential to the arcuate portion 19 are distorted into contact with faces 21 by the clamping action of the head of bolts 22.

While I have described my invention in connection with a specific embodiment thereof, it is to be understood that this is by way of illustration and not by way of limitation, the scope of my invention being defined by the appended claims, which should be construed as broadly as the prior art will permit.

I claim:

1. In a universal joint including a pair of yokes and a spider member interposed therebetween having radially extending trunnions carried by said yokes, bearing sleeves on each of said trunnions, at least one of said bearing sleeves being fastened to its respective yoke by means of a steel strap, said strap having a central arcuate portion engaging said sleeve and a pair of oppositely extending substantially tangential end portions arranged to be fastened to its corresponding yoke, said yoke being formed with a complementary attaching face on each side of said sleeve for the reception of said end portions, the planes of said faces extended intersecting said bearing sleeve, bolts passing through said end portions of said strap and received in threaded openings in said faces at substantial right angles thereto, whereby when said bolts are tightened said strap is distorted into conformity with said faces and thus tightly clamp said sleeve to said yoke.

2. In a universal joint including a pair of yokes and a spider member interposed therebetween having radially extending trunnions carried by said yokes, each of said trunnions having a bearing sleeve, a steel strap for fastening said sleeve to said yoke, said strap having a central arcuate portion engaging said sleeve and a pair of oppositely extending substantially tangential end portions, said yoke being formed with a complementary attaching face on each side of said sleeve for the reception of said end portions, said faces each defining a small angle with said tangential end portions of said strap and the planes of said faces extended intersecting said bearing sleeve, bolts passing through said respective end portions of said strap and received in threaded depressions in said faces at substantial right angles thereto, whereby when said bolts are tightened said tangential portions of said strap are distorted in conformity with said faces and thereby tightly clamp said bearing sleeve to said yoke.

3. In a universal joint including a pair of yoke members and an intermediate spider member having radially extending trunnions supported by said yoke members, a bearing member on one of said trunnions, a resilient metal strap for fastening said bearing member to said yoke, said strap having a central portion generally conforming to said bearing member and a pair of diverging end portions, said associated yoke member being formed with complementarily diverging attaching faces on opposite sides of said bearing member for the reception of said oppositely extending end portions of said strap, the planes of said faces extended intersecting said bearing member, the normal angle of divergence between said end portions being less than the angle of divergence between said faces and means for drawing said end portions tightly against said faces to increase said normal angle of divergence to substantially that between said faces to clamp said bearing member tightly in place.

4. In a universal joint including a pair of yoke members and an intermediate spider member having radially extending trunnions, means for drivingly connecting said trunnions to said yoke members comprising bearing cups, at least one of said yoke members being axially recessed for the partial reception of the associated cups, resilient metal strap members having a central portion generally conforming to the adjacent outer periphery of said cups each having a pair of end portions normally diverging outwardly at a first angle, said associated yoke being formed with a pair of complementarily diverging attaching faces on each side of said recesses, said faces having a second angle of divergence greater than said first angle, and means for drawing said end portions into contact with said attaching faces whereby to increase said first angle of divergence to substantially the value of said second angle of divergence between said attaching faces.

5. In a universal joint including a pair of yokes and a spider member interposed therebetween having radially extending trunnions carried by said yokes, each of said trunnions having a bearing sleeve, the lateral exterior surface of which is cylindrical, said yoke being formed with an axially opening semi-cylindrical bearing seat in which a bearing sleeve is seated, and with a pair of attaching faces disposed on the respective sides of said seat and converging toward the open side thereof, a fastening strap having a central arcuate portion engaging said sleeve and a pair of end portions projecting beyond the sleeve and diverging at an angle normally less than the angle of convergence of said attaching faces and means for drawing said end portions tightly against said faces so as to increase the angle of divergence of said end portions and thereby clamp said bearing member with a portion of its cylindrical surface tightly in engagement with said bearing seat.

ERNEST J. KARLBERG.